United States Patent [19]
Solomon

[11] Patent Number: 5,980,036
[45] Date of Patent: Nov. 9, 1999

[54] EYEGLASS DEVICES WITH REMOVABLE AUXILIARY LENSES OR FRAMES

[75] Inventor: Charles I. Solomon, San Antonio, Tex.

[73] Assignee: World Precision Instruments, Inc., San Antonio, Tex.

[21] Appl. No.: 09/109,223

[22] Filed: Jun. 30, 1998

Related U.S. Application Data

[60] Provisional application No. 60/052,522, Jun. 30, 1997.

[51] Int. Cl.⁶ .................................................. G02C 9/00
[52] U.S. Cl. .............................................. 351/47; 351/57
[58] Field of Search ................................. 351/47, 48, 57, 351/58, 44, 41

[56] References Cited

U.S. PATENT DOCUMENTS

| | | | |
|---|---|---|---|
| 3,238,005 | 3/1966 | Petitto | 351/47 |
| 3,422,449 | 1/1969 | Rinnman | 351/121 |
| 4,070,103 | 1/1978 | Meeker | 351/52 |
| 4,196,981 | 4/1980 | Waldrop | 351/59 |
| 4,304,469 | 12/1981 | Solomon | 351/121 |
| 4,357,080 | 11/1982 | Solomon | 351/86 |
| 5,181,051 | 1/1993 | Townsend et al. | 351/52 |
| 5,321,442 | 6/1994 | Albanese | 351/44 |
| 5,416,537 | 5/1995 | Sadler | 351/57 |
| 5,568,207 | 10/1996 | Chao | 351/57 |
| 5,696,571 | 12/1997 | Spencer et al. | 351/47 |
| 5,737,054 | 4/1998 | Chao | 351/47 |

*Primary Examiner*—Hung Xuan Dang
*Attorney, Agent, or Firm*—Christopher L. Makay

[57] ABSTRACT

An eyeglass device includes a frame supporting first and second lenses therein. The frame includes support hooks and latch assemblies that permit the securing of third and fourth lenses to the frame over a respective first and second lens. Alternatively, an auxiliary frame is fastened to the frame using securing members attached to the auxiliary frame, the frame, or both the auxiliary frame and the frame.

4 Claims, 5 Drawing Sheets

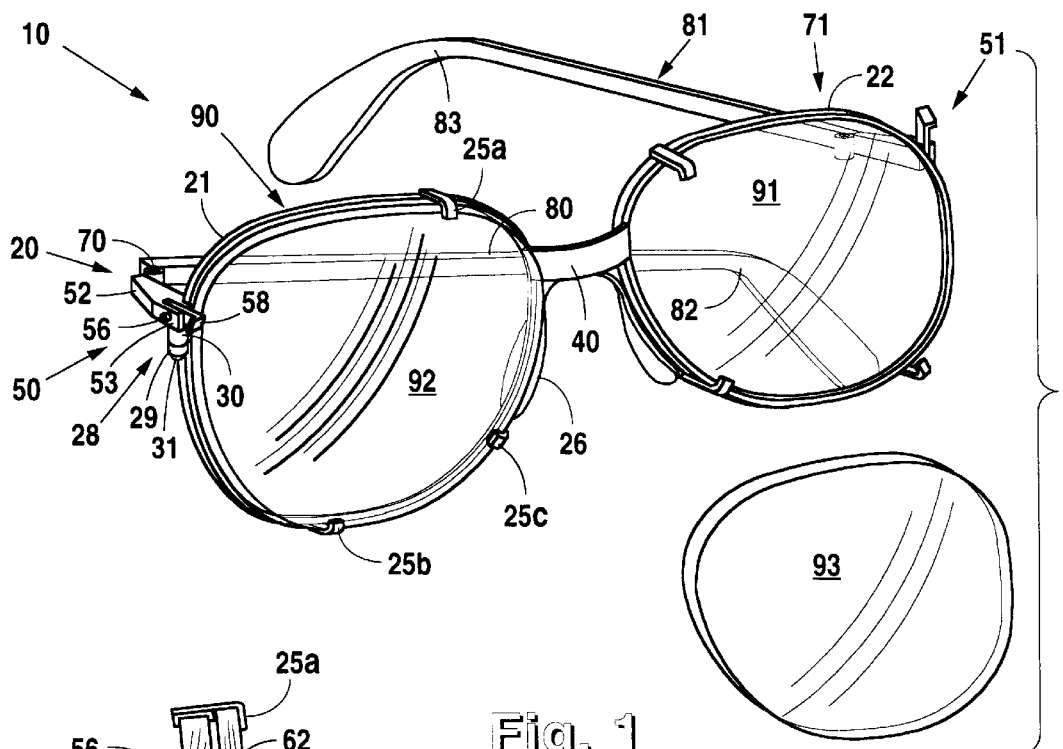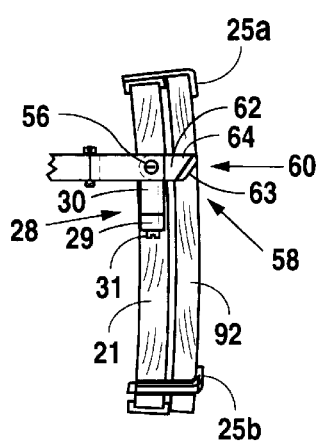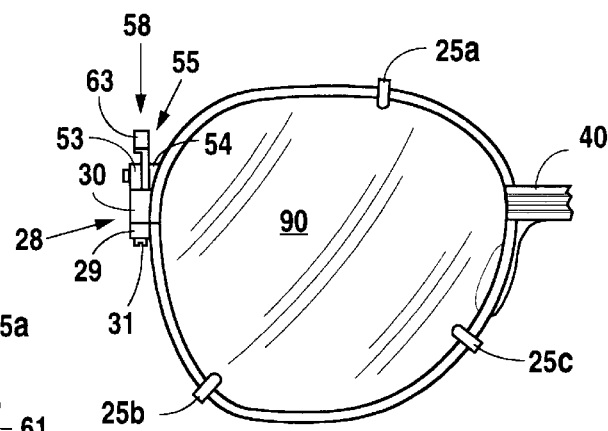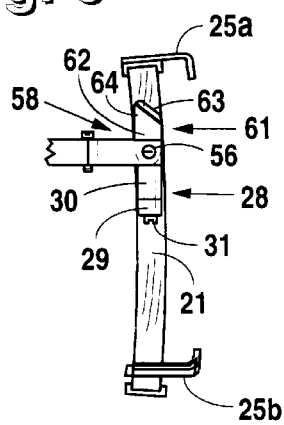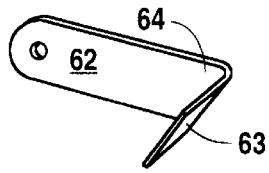
Fig. 1
Fig. 3
Fig. 2
Fig. 4
Fig. 5

EYEGLASS DEVICES WITH REMOVABLE AUXILIARY LENSES OR FRAMES

This application claims benefit of Provisional Application Ser. No. 60/052,522 filed Jan. 30, 1997.

BACKGROUND OF THE INVENTION

1. Field of the Invention

The present invention relates to eyeglass devices and, more particularly, but not by way of limitation, to eyeglass devices with auxiliary lenses or frames.

2. Description of the Related Art

Eyeglass devices typically include a primary frame for supporting two lenses that, depending upon the needs of a wearer, function to correct vision, provide eye protection, or shade the eyes. Due to these varying needs, some frames permit the interchanging of lenses or the attachment of auxiliary frames to the primary frames to provide the wearer flexibility.

One such eyeglass device is disclosed in U.S. Pat. No. 4,357,080, which issued on Nov. 2, 1982, to Solomon. Solomon includes an eyeglass frame having two latches. Hooks are positioned about the frame's periphery to secure the lenses to the frame. Each latch has a pivotable arm that, in a first horizontal position, secures a lens against the hooks and, in a second vertical position, permits removal of the lens from the hooks. To remove a lens, a wearer's finger pivots the latch arm upwards releasing the lens. Once the lens is removed from the hooks, another lens is slid underneath the hooks. Pivoting the arm downward secures the lens to the frame.

Another eyeglass device is disclosed in U.S. Pat. No. 5,416,537, which issued on May 16, 1995, to Sadler. The Sadler device includes a primary spectacle device and a separate one-piece lens. The primary spectacle device includes a bridge, two eyepieces, two temple members, and two primary lenses. Each eyepiece supports a single lens and is integrally formed with an opposing end of the bridge. The frame temple members permanently and pivotally connect to respective eyepieces. Each eyepiece also has a magnetic member connected to its face corresponding to the temporal region of the wearer. The one-piece lens has two magnetic members affixed to its backside. The lens's magnetic members connect with the primary magnetic members for facilitating the lens's attachment to and removal from the primary spectacle device.

A further eyeglass device is disclosed in U.S. Pat. No. 5,568,207, which issued on Oct. 22, 1996, to Chao. The Chao device includes a primary spectacle device and an auxiliary spectacle device. The primary spectacle device includes a bridge, two eyepieces, two temple members, two primary lenses, and two protrusions. Each eyepiece supports a single lens and is integrally formed with an opposing end of the bridge. The frame temple members permanently and pivotally connect to respective eyepieces. The protrusions have respective magnetic members and connect at the periphery of respective eyepieces. Each protrusion is located proximate to the connection of the respective eyepiece and temple member.

The auxiliary spectacle device includes a bridge, two eyepieces, and two arms. Each eyepiece supports a single lens and is integrally formed with an opposing end of the bridge. The arms are integrally formed with respective eyepieces and extend rearwardly from their respective eyepieces' periphery. Each arm has a magnetic member for engagement with respective magnetic members of the primary spectacle device. The magnetic members of both devices facilitate the auxiliary spectacle device's attachment to and removal from the primary spectacle device.

Although the Solomon frame design permits the interchanging of lenses, it suffers several disadvantages. A wearer requiring prescription lenses to correct vision defects cannot substitute non-prescription lenses if, for example, safety lenses are required because a substantial impairment of vision will occur. In addition, the latch arm is sometimes difficult to operate. The wearer's finger engages the relatively smooth, elongated latch arm to raise it. If moisture is present on the wearer's finger or the arm, the finger may slide off the arm's smooth surface, thereby failing to lift it.

Although the Sadler and Chao devices use magnets to attach a respective auxiliary lens or frame to a primary frame, both designs fail to properly secure the auxiliary piece. If the wearer should pivot his head rapidly downward, the auxiliary piece disengages from the primary frame. This accidental disengagement may result in damage to or loss of the auxiliary lens or frame.

Accordingly, an eyeglass device permitting a prescription lens wearer to wear non-prescription lenses and having an easily grasped latch arm, or an eyeglass device that enhances the securing of an auxiliary piece to a primary frame will improve over conventional eyeglasses.

SUMMARY OF THE INVENTION

In accordance with the present invention, an eyeglass device includes a frame. A first lens support of the frame includes a first lens mounted therein. A second lens support of the frame includes a second lens mounted therein. A bridge of the frame connects the first and second lens supports. A first arm of the frame connects to the first lens support, and a first temple member of the frame attaches to the first arm. A second arm of the frame connects to the second lens support, and a second temple member of the frame attaches to the second arm.

In a first embodiment, the first lens support of the frame includes a first set of support hooks, and the second lens support of the frame includes a second set of support hooks. The first arm of the frame includes a first latch assembly mounted thereon, while the second arm of the frame includes a second latch assembly mounted thereon. A third lens is placeable within the first set of support hooks wherein a first position of the first latch assembly secures the third lens within the first set of support hooks and a second position of the first latch assembly releases the third lens from the first set of support hooks. Similarly, a fourth lens is placeable within the second set of support hooks wherein a first position of the second latch assembly secures the fourth lens within the second set of support hooks and a second position of the second latch assembly releases the fourth lens from the second set of support hooks.

In a second embodiment, the first arm of the frame includes a first aperture therethrough, while the second arm of the frame includes a second aperture therethrough. An auxiliary frame includes a first lens support having a first lens mounted therein and a second lens support having a second lens mounted therein. The auxiliary frame further includes a bridge connecting the first and second lens supports. A first hook attached to the first lens support inserts into the first aperture to fasten the auxiliary frame to the frame. Similarly, a second hook attached to the second lens support inserts into the second aperture to fasten the auxiliary frame to the frame. The bridge of the auxiliary frame is a clip mountable on the bridge of the frame to fasten the auxiliary frame to the frame.

In an alternative of the second embodiment, a first post mounted to the first arm of the frame defines the first aperture, and a second post mounted to the second arm of the frame defines the second aperture. The bridge of the frame includes a magnet attached thereto, and the bridge of the auxiliary frame includes a magnet attached thereto that engages the magnet of the bridge of the frame to fasten the auxiliary frame thereto.

In a third embodiment of the eyeglass device, the first and second lens supports of the frame include magnetic members secured thereto, and the bridge connecting the first and second lens supports also includes a magnetic member secured thereto. In addition, the first and second arms of the frame include magnetic members secured thereto. An auxiliary frame constructed from magnetic material includes first and second lens supports each having a respective first and second lens mounted therein, and first and second arms attached to a respective first and second lens supports. The auxiliary frame further includes a bridge connecting the first and second lens supports. The first and second lens supports engage the magnetic members of the respective first and second lens supports of the frame, the first and second arms engage the magnetic members of the respective first and second arms of the frame, and the bridge engages the magnetic member of the bridge of the frame, thereby fastening the auxiliary frame to the frame.

In a fourth embodiment of the eyeglass device, the first and second lens supports of the frame each include a clip of metallic material removably attached thereto. The bridge of the frame connecting the first and second lens supports also includes a clip of metallic material removably attached thereto. An auxiliary frame includes first and second lens supports each including a magnetic member that engages the respective clip of the first and second lens supports of the frame to fasten the auxiliary frame thereto. The auxiliary frame further includes a bridge connecting the first and second lens supports, wherein the bridge includes a magnetic member that engages the clip of the bridge of the frame to fasten the auxiliary frame thereto.

It is an object of the present invention to provide an eyeglass device that includes substantially permanent and removable lenses.

It is a further object of the present invention to provide a catch for engagement by a user's digit.

It is an additional object of the present invention to provide a hook and clip to an auxiliary frame to facilitate attachment to a primary frame.

It is still a further object to provide magnetic members and a clip to an auxiliary frame to facilitate attachment to a primary frame.

Another object of the present invention is to provide a primary frame having magnetic members and an auxiliary frame constructed of metal.

Still another object of the present invention is to provide metal clips that attach to a primary frame for facilitating the attachment of an auxiliary piece having magnetic members.

Still other objects, features, and advantages of the present invention will become evident to those skilled in the art in light of the following.

BRIEF DESCRIPTION OF THE DRAWINGS

FIG. 1 is a perspective view of a first embodiment of an eyeglass device that includes removable lenses where one lens is removed.

FIG. 2 is a front, elevational view of a single lens and lens support with a latch arm in the open position.

FIG. 3 is a side, elevational view of the latch arm in a closed position.

FIG. 4 is a side, elevational view of the latch arm in an open position with the removable lens taken out.

FIG. 5 is a perspective view of the latch arm.

DETAILED DESCRIPTION OF THE PREFERRED EMBODIMENTS

Figure 6:
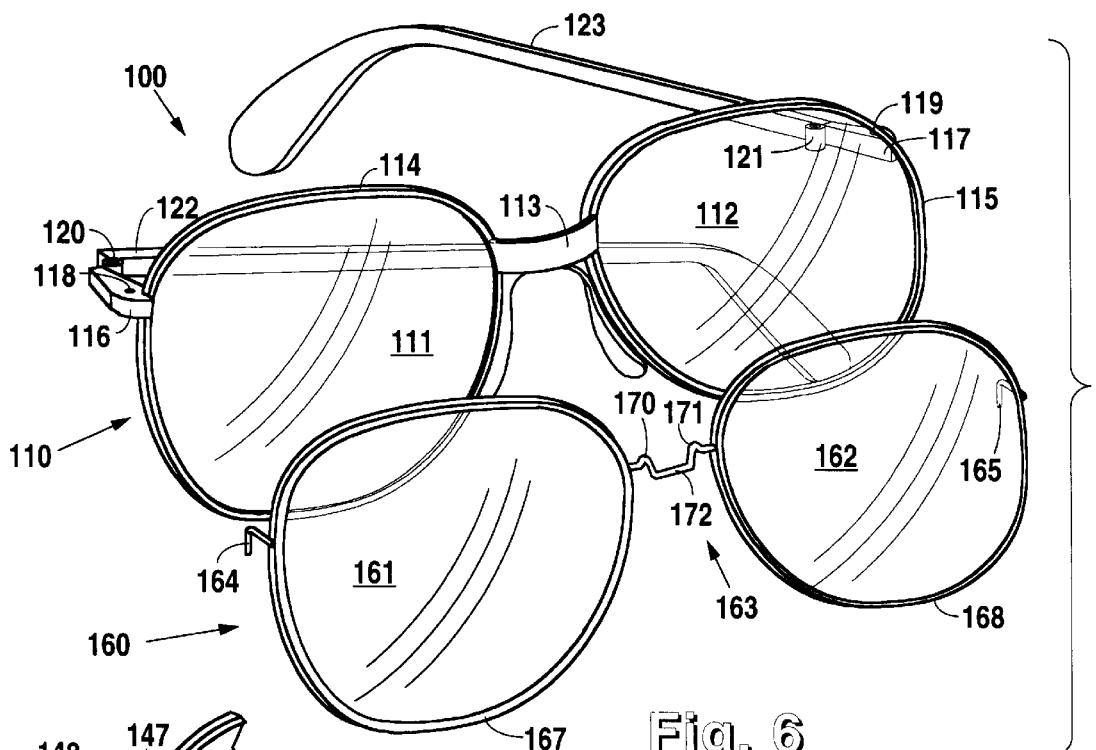
FIG. 6 is a perspective view of a second embodiment of an eyeglass device having a primary frame and an auxiliary frame.

Referring to FIGS. 1–5, a first embodiment of an eyeglass device 10 includes a frame 20, first and second substantially permanent lenses 90–91, and first and second removable lenses 92–93. The frame 20 includes first and second lens supports 21–22, a bridge 40, first and second latch assemblies 50–51, hinges 70–71, and first and second temple members 80–81. The bridge 40 attaches to the supports 21–22 using any suitable means such as welding to provide a connection therebetween. Latch assemblies 50–51 attach to respective supports 21–22 using any suitable means such as welding. Respective hinges 70–71 connect respective latch assemblies 50–51 to respective first and second temple members 80–81 using any suitable means such as mechanical fasteners. First and second temple members 80–81 have respective ear hooks 82–83 that aid in securing the eyeglass device 10 to a wearer's head.

First and second lens supports 21–22 are substantially identical, so only the first lens support 21 will described in detail herein. The first lens support 21 is substantially circular and includes an open end. The first lens support 21 further includes support hooks 25a–c, a nose pad 26, and a post 28. Support hooks 25a–c attach to the lens support 21 using any suitable means, such as welding, to secure and support the first removable lens 92 within the lens support 21. The nose pad 26 attaches to the support 21 using any suitable means, such as welding, to assist in securing the eyeglass device 10 to the wearer's head. The post 28 includes a first post section 29 and a second post section 30. The first post section 29 attaches to one side of the open end of the support 21, while the second post section 30 attaches to the other side of the open end of the support 21. Both first and second sections 29 and 30 attach to their respective sides of support 21 using any suitable means such as welding. A screw 31 inserts into the bottom of the first post section 29 and extends into the second post section 30 for closing the open end of the lens support 21 together. Removing the screw 31 separates the first and second post sections 29–30 and reforms the open end of the lens support 21 to permit the replacement of the first substantially permanent lens 90.

Latch assemblies 50–51 are substantially identical, so only the latch assembly 50 will be described in detail herein. The latch assembly 50 includes a body 52, a latch pin 56, and a latch arm 58. The body 52 includes first and second arms 53–54 that extend substantially parallel from the body 52 to form a slot 55. The latch pin 56 pivotally secures the latch arm 58 within the slot 55. The latch arm 58 pivots between a substantially horizontal first position 60 that secures the first removable lens 92 within the hooks 25a–c of the support 21 and a substantially vertical second position 61 that permits the removal of the lens 92 from the support 21.

The latch arm 58 includes a body 62, a catch 63, and a beveled tip 64. The body 62, which is integrally formed with the beveled tip 64, is generally rectangular in shape and has a curved end near the latch pin 56. The substantially rectangular catch 63 is integrally formed with the beveled tip 64 and extends outwardly from the body 62 and beveled tip 64 to form a substantial L-shape that provides a grasping surface for the wearer's digit.

In one possible use, the eyeglass device 10 permits a wearer to use prescription lenses for first and second substantially permanent lenses 90–91. If desired, removable lenses 92–93 may be attached to the frame 20. Examples of these lenses 92–93 include tinted lenses for daytime use or protective lenses for industrial use depending upon the needs of the wearer.

Referring to FIGS. 6–10, a second embodiment of an eyeglass device 100 includes a primary frame 110 and an auxiliary frame 160. The primary frame 110 includes first and second lenses 111–112, first and second lens supports 114–115, a bridge 113, first and second arms 116–117, hinges 120–121, and first and second temple members 122–123. The bridge 113 attaches to the supports 114–115 using any suitable means such as welding to provide a connection therebetween. The supports 114–115 receive respective lenses 111–112 therein. Arms 116–117 attach to respective supports 114–115 using any suitable means such as welding and have respective apertures 118–119 therethrough. Respective hinges 120–121 connect respective arms 116–117 to respective first and second temple members 122–123 using any suitable means such as mechanical fasteners.

The auxiliary frame 160 includes first and second lens 161–162, first and second lens supports 167–168, a clip 163, and hooks 164–165. The clip 163 attaches to the supports 167–168 using any suitable means such as welding to provide a connection therebetween. The clip 163 has arcuate members 170–171 that extend rearwardly for positioning a catch 172. The supports 167–168 receive respective lenses 161–162 therein. Hooks 164–165 attach to respective supports 167–168 using any suitable means such as welding.

The auxiliary frame 160 attaches to the primary frame 110 by inserting the hooks 164 and 165 (see FIGS. 7 and 9) into respective apertures 118–119 of arms 116–117. The clip 163 further secures the auxiliary frame 160 by positioning its catch 172 behind the bridge 113.

Figure 8:
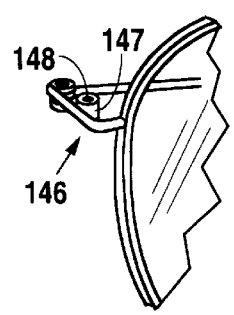
FIG. 8 is a partial perspective view of an alternative embodiment of an arm for the primary frame.
Figure 9:
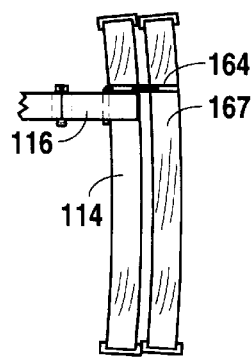
FIG. 9 is a partial side, elevational view illustrating a hook inserted into an aperture of an arm.

As shown in FIG. 8, an alternative embodiment of an arm 146 includes a post 147 having an aperture 148 therethrough. Two arms 146, one positioned at either end of the primary frame 110, receive hooks 164 and 165 within their respective posts 147 for securing the auxiliary frame 160.

Figure 10:
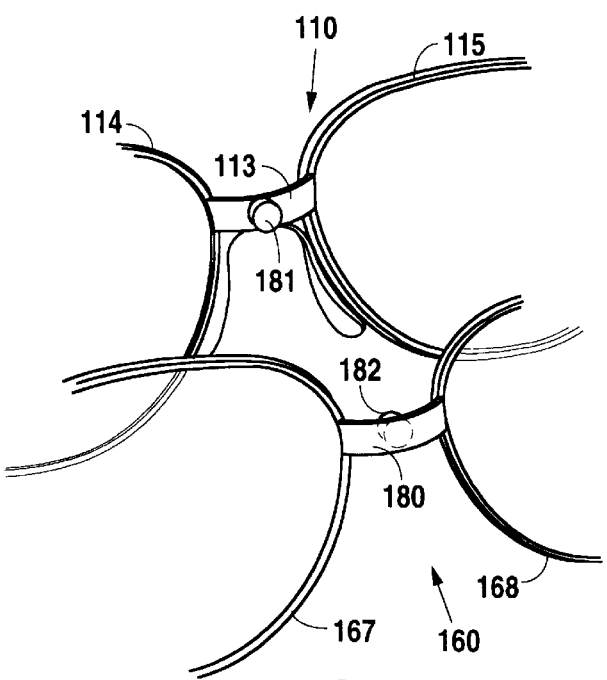
FIG. 10 is a partial perspective view of an alternative embodiment of a middle attachment that includes a magnetic members positioned on bridges of the primary and auxiliary frames.
Figure 7:
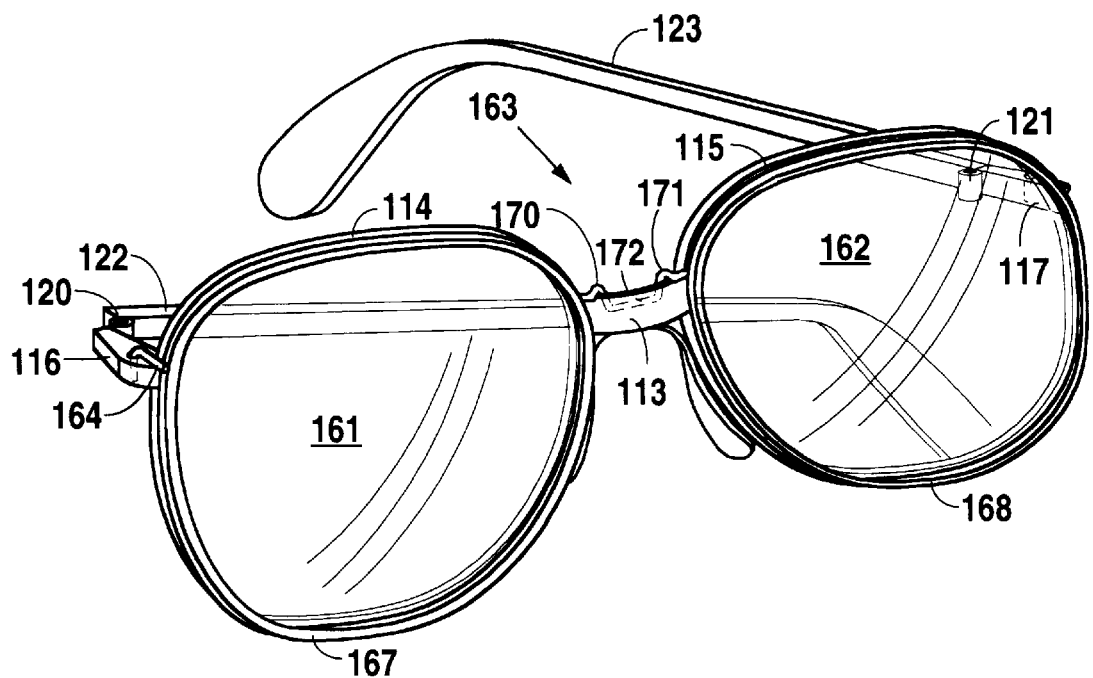
FIG. 7 is a perspective view of the second embodiment of an eyeglass device illustrating the attachment of the auxiliary frame to the primary frame.

As shown in FIG. 10, the clip 163 may be replaced by magnets 181–182. The magnet 181 is attached to the bridge 113 of the primary frame 110, and the magnet 182 is attached to a bridge 180 of the auxiliary frame 160. The bridge 180 connects the lens supports 167–168 together. The hooks 164–165 and the magnets 181–182 fasten the auxiliary frame 160 to the primary frame 110.

Figure 11:
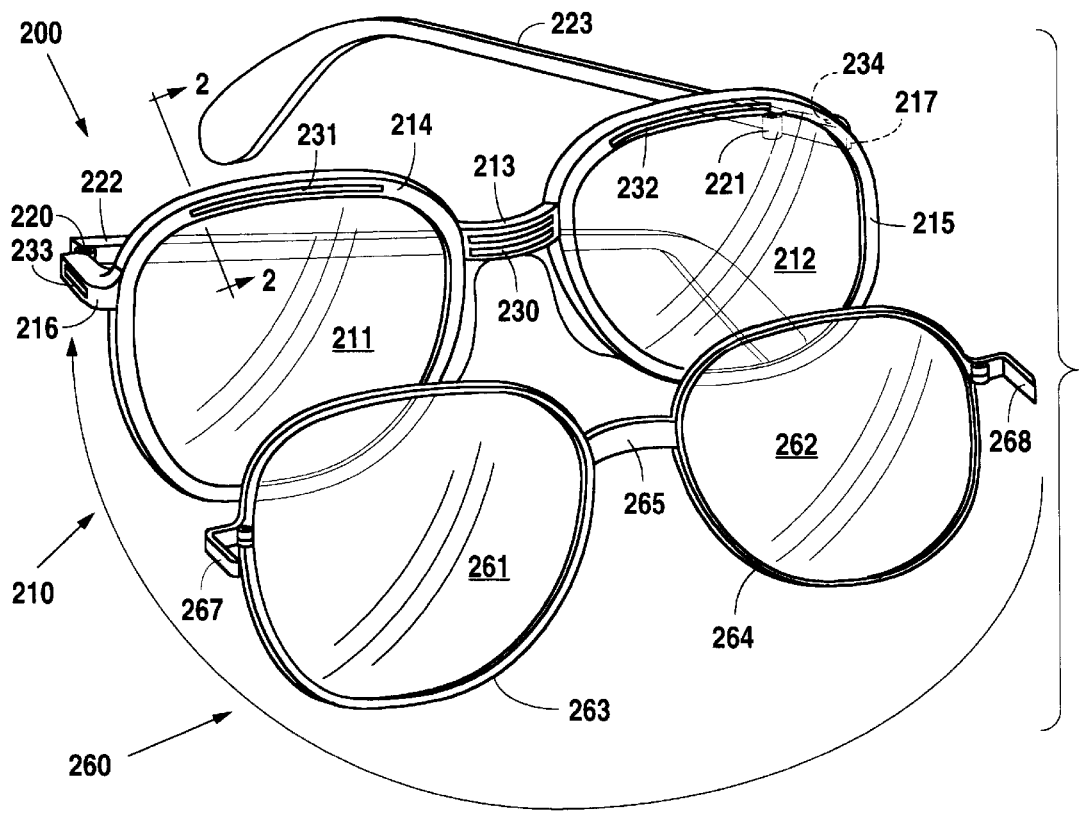
FIG. 11 is a perspective view of a third embodiment of an eyeglass device having a primary frame and an auxiliary frame.
Figure 12:
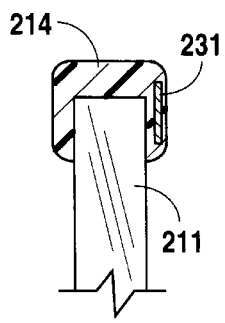
FIG. 12 is a cross-sectional, elevational view along line 2—2 illustrating a magnetic member embedded in the primary frame.
Figure 13:
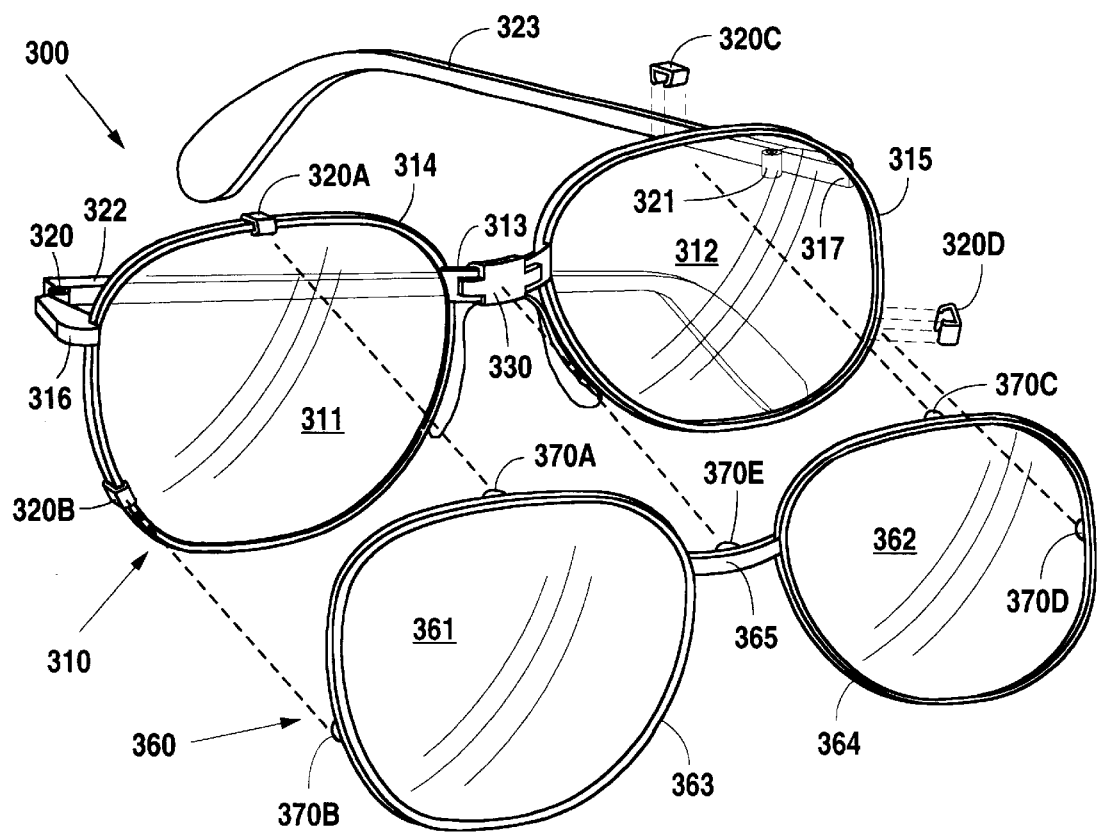
FIG. 13 is a perspective view of a fourth embodiment of an eyeglass device having a primary frame and an auxiliary piece.
Figure 14:
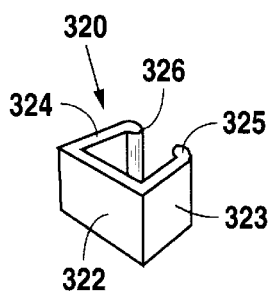
FIG. 14 is a perspective view of a clip for a lens support of the primary frame.
Figure 15:
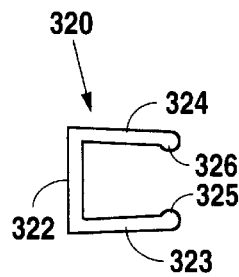
FIG. 15 is a top, plan view of the clip for the lens support of the primary frame.
Figure 16:
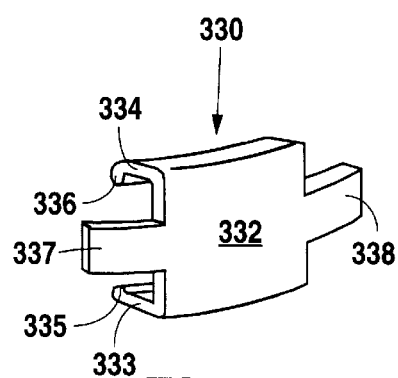
FIG. 16 is a perspective view of a clip for a bridge of the primary frame.

Referring to FIGS. 11–12, a third embodiment of an eyeglass device 200 includes a primary frame 210 and an auxiliary frame 260. The primary frame 210 includes first and second lenses 211–212, first and second lens supports 214–215, a bridge 213, first and second arms 216–217, hinges 220–221, first and second temple members 222–223, and magnetic members 230–234. The bridge 213 attaches to the supports 214–215 using any suitable means such as welding to provide a connection therebetween. The supports 214–215 receive respective lenses 211–212 therein. Arms 216–217 attach to respective supports 214–215 using any suitable means such as welding. Respective hinges 220–221 connect respective arms 216–217 to respective first and second temple members 222–223 using any suitable means such as mechanical fasteners. The first magnetic member 230 is positioned on the outer face of the bridge 213, second and third magnetic members 231 and 232 are positioned on the respective upper portions of the supports 214 and 215, and fourth and fifth magnetic members 233 and 234 are positioned on the respective outer sides of the arms 216 and 217. The magnetic members 230–234 may be positioned on the outer surface of the primary frame 210 (see FIG. 11) or may be imbedded in the primary frame 210 and concealed with a thin covering of frame material (see FIG. 12).

The auxiliary frame 260 includes first and second lens 261–262, first and second lens supports 263–264, a bridge 265, and arms 267–268. The bridge 265 attaches to the supports 263–264 using any suitable means such as welding to provide a connection therebetween. The supports 263–264 receive respective lenses 261–262 therein. Arms 267–268 attach to respective supports 263–264 using any suitable means such as welding. The supports 263 and 264, bridge 265, and arms 267 and 268 are constructed from a metallic material, such as iron.

The auxiliary frame 260 attaches to the primary frame 210 by positioning the respective arm 268 and 267 on the respective magnetic members 233 and 234. The magnetic attraction of the magnet members 233 and 234 secure the metal arms 268 and 267 to the primary frame 210. The magnetic attraction of the magnetic members 230–232 with respective metal bridge 265 and supports 263 and 264 further secure the auxiliary frame 260 to the primary frame 210. The auxiliary frames 260 may be removed by applying sufficient force to overcome the magnetic attraction of the magnetic members 230–234.

Referring to FIGS. 13–16, an additional embodiment of an eyeglass device 300 includes a primary frame 310, clips 320A–D and 330, and an auxiliary frame 360. The primary frame 310, which may be a conventional eyeglass frame, includes first and second lenses 311–312, first and second lens supports 314–315, a bridge 313, first and second arms 316–317, hinges 320–321, and first and second temple members 322–323. The bridge 313 attaches to the supports 314–315 using any suitable means such as welding to provide a connection therebetween. The supports 314–315 receive respective lenses 311–312 therein. Arms 316–317 attach to respective supports 314–315 using any suitable means such as welding. Respective hinges 320–321 connect respective arms 316–317 to respective first and second temple members 322–323 using any suitable means such as mechanical fasteners.

The clip 320, constructed from a metallic material such as iron, is attached to either support 314 or 315. The clip 320 includes a substantially rectangular body 322 formed integrally with two substantially rectangular legs 323 and 324, thereby creating a substantial U-shape. These legs 323 and 324 are flexible with respect to the body 322. Each leg 323 and 324 terminates in a respective lip 325 and 326. The lips 325 and 326 secure the clip 320 to the primary frame 310. In this preferred embodiment, two clips 320A–B are attached to the support 314 and two clips 320C–D are attached to the support 315.

The clip 330, constructed from a metallic material such as iron, is attached to the bridge 313. The clip 330 includes a substantially rectangular body 332, legs 333 and 334, and arms 337 and 338. The substantially rectangular arms 337 and 338 are formed integrally with the body 332. The legs 333 and 334 are formed integrally with and are flexible with respect to the body 332. Each leg 333 and 334 terminates in a respective lip 335 and 336. The lips 335 and 336 secure the clip 330 to the bridge 313 of the primary frame 310. The clips 320A–D and the clip 330 are easily attached and removed from the primary frame 310 for facilitating the attachment of an auxiliary frame 360 (described herein). In addition, the clips 320A–D and the clip 330 may be manufactured in various sizes to accommodate varying sizes of primary frames.

The auxiliary frame 360 includes first and second lens 361 and 362, first and second lens supports 363 and 364, a bridge 365, and magnetic members 370A–E. The bridge 365 attaches to the supports 363–364 using any suitable means such as welding to provide a connection therebetween. The supports 363–364 receive respective lenses 361–362 therein. The magnetic members 370A–B are attached to lens support 363, the magnetic members 370C–D are attached to the lens support 364, and the magnetic member 370E is attached to the bridge 365. To facilitate the attachment of the auxiliary frame 360 to the primary frame 310, the clips 320A–E may be aligned with respective magnetic members 370A–E. Positioning the auxiliary frame 360 proximate to the primary frame 310 allows magnetic attraction to secure the frame 360 to the frame 310. The auxiliary frame 360 may be separated from the primary frame 310 by applying sufficient force to overcome the magnetic attraction. Although an auxiliary frame 360 has been described, it should be understood that the magnetic members 370A–E may be attached to a one-piece lens to facilitate the attachment of an auxiliary piece to the primary lens.

Although the present invention has been described in terms of the foregoing embodiment, such description has been for exemplary purposes only, and, as will be apparent to one of ordinary skill in the art, many alternatives, equivalents, and variations of varying degrees will fall within the scope of the present invention. That scope, accordingly, is not to be limited in any respect by the foregoing description, rather, it is defined only by the claims that follow.

I claim:

1. An eyeglass device, comprising:

a frame including first and second sets of support hooks and first and second sets of latch assemblies mounted thereon;

first and second lenses mounted within the frame;

a third lens placeable within the first set of support hooks wherein a first position of the first latch assembly secures the third lens over the first lens and within the first set of support hooks and a second position of the first latch assembly releases the third lens from the first set of support hooks; and a fourth lens placeable within the second set of support hooks wherein a first position of the second latch assembly secures the fourth lens over the second lens and within the second set of support hooks and a second position of the second latch assembly releases the fourth lens from the second set of support hooks.

2. An eyeglass device, comprising:

a frame including at least one removable clip of metallic material attached thereto; and an auxiliary frame including a magnetic member that engages the clip of the frame to fasten the auxiliary frame to the frame.

3. The eyeglass device according to claim 2 wherein the frame comprises:

first and second lens supports each having a clip of metallic material attached thereto; and a bridge connecting the first and second lens supports, the bridge including a clip of metallic material attached thereto.

4. The eyeglass device according to claim 3 wherein the auxiliary frame comprises:

a first lens support including a magnetic member that engages the clip of the first lens support of the frame to fasten the auxiliary frame thereto;

a second lens support including a magnetic member that engages the clip of the second lens support of the frame to fasten the auxiliary frame thereto;

a bridge connecting the first and second lens supports, the bridge including a magnetic member that engages the clip of the bridge of the frame to fasten the auxiliary frame thereto.

* * * * *